United States Patent Office 3,499,753
Patented Mar. 10, 1970

3,499,753
PROCESS FOR THE PREPARATION OF TANTALUM POWDER
Gustav Daendliker, Birsfelden, Switzerland, assignor, by mesne assignments, to Hermann C. Starck Berlin, Berlin, Germany
No Drawing. Filed Jan. 13, 1967, Ser. No. 609,001
Claims priority, application Switzerland, Feb. 2, 1966, 1,438/66
Int. Cl. C22b 51/00; C22f 1/00
U.S. Cl. 75—.5                                                    5 Claims

ABSTRACT OF THE DISCLOSURE

A process for the preparation of tantalum powder by reducing tantalum oxide with carbon in a high vacuum, wherein the reduction is performed in two stages and at temperatures below 2000° C., with the starting material having as far as possible a stoichiometric composition, possibly with a slight carbon excess, and wherein between the first and the second reaction stages the oxygen deficiency is made good by oxidation.

---

It is known that tantalum powder can be prepared by reducing tantalum oxide with graphite at a high temperature under a high vacuum. The preparation of such powders, which are particularly suitable for use in capacitors, has likewise been described. It has, however, been found that the known processes have technical disadvantages in their industrial use and give rise to products that are only restrictedly suitable for the special use concerned. A main demand affecting the quality of such products is that the tantalum powder ready for use may contain only minimal quantities of impurities (oxygen below 1500, carbon below 200 parts per million). Furthermore, it is desirable that metal powders to be used in sintered capacitors should have a craggy particle structure of large surface because this type results in products of high capacity that do not shrink excessively during sintering.

The simplest route leading to tantalum powders of low oxygen and carbon content would appear to be the use of a stoichiometrically composed starting mixture of tantalum oxide and carbon, possibly with a maximal oxygen excess of 1500 parts per million, but in industrial practice this method offers considerable difficulties. To achieve a mixture of such accurate composition the analytical composition of the oxide, which as a rule may lose, for example, 0.01 to 0.5% of its weight on ignition, and of the graphite, which rarely contains more than 96 to 98% of carbon, must be accurately known and must not undergo subsequent variations, caused for instance by variations in the atmospheric humidity. Even if it is possible to prepare such mixtures, large scale sintering operations with their use are unsuccessful. At the temperatures needed for the reaction the tantalum oxide compounds used are already very volatile. Oxygen deficiency occurs on the surface of the batch in consequence of volatilization both outwardly, and also into the interior of the batch where oxygen enrichment occurs, by condensation caused by the generally lower temperature. In this way the stoichiometric relation is continually substantially disturbed during the reaction. A heterogeneous product results which has partially too high an oxygen content and partially too high a carbon content.

An expedient utilized in most processes is to introduce a relatively large excess of oxygen in the form of tantalum oxide. Owing to the increased oxygen activity it is not necessary to take into consideration the volatility of tantalum oxide in the final phase. Subsequently, however, the excess tantalum oxide must be volatilized for which, in view of the volatilization kinetics, temperatures above 2000° C. are needed. This involves an appreciable loss of material which, moreover, can react with the lining material of the furnace to damage the latter, or may impair the vacuum. Furthermore, the high final sintering temperature sinters the material to such an extent that after hydration, comminution and dehydration it furnishes particles that no longer display the desired craggy, large surface.

The present invention provides a process for the preparation of tantalum powder by reducing tantalum oxide with carbon in a high vacuum, wherein the reduction is performed in two stages and at temperatures below 2000° C., with the starting material having as far as possible a stoichiometric composition, possibly with a slight carbon excess, and wherein between the first and the second reaction stages the oxygen deficiency is made good by oxidation, by admixing oxygen-rich tantalum, or by adding tantalum oxide or a tantalum alcoholate.

It has been observed that it is easier to make good in the second stage a deficiency of oxygen than an excess of oxygen. By virtue of the high carbon activity it is possible to remove in the first sintering stage the oxygen by reacting at temperatures substantially below 2000° C., preferably at 1600 to 1850° C., to leave a mean oxygen content of less than 1000 parts per million. The modest amounts of oxygen carried over act as inhomogeneities in the carbon distribution and the rate of conversion is almost quantitative. These inhomogeneities are compensated in the second sintering stage by transfer to another vessel. Local inhomogeneities are inconsequential in view of the mobility of oxygen. The deficiency of oxygen is made good before the second stage, either by oxidizing the tantalum with air or pure oxygen, or by adding tantalum rich in oxygen, or by impregnating the porous product with a suspension of finely disperse oxide or with a solution of a tantalum alcoholate. Since no oxides have to be volatilized in the second stage, it may likewise be performed at the indicated relatively low temperature. Since the total concentration of oxygen in this stage is at most a few 1000 parts per million, a slight carryover is no longer of any significance. However, what is essential in this process is the low reaction temperature which gives rise to a very porous tantalum material which can be made up into a capacitor powder of the desired quality.

Example 1

20 kilograms of tantalum oxide in powder form are intimately mixed with 2.716 kg. of finely ground, calcined graphite in a belt mixer, and the mixture is converted in a plunger press into tablets of 10 mm. diameter and about 5 mm. thickness.

2.4 kilograms of these tablets are reacted in a high vacuum furnace by being gradually heated to 1800° C. the heating being continued until a vacuum of $9.8 \times 10^{-5}\mu$ has been reached. The tablets are then once more mixed. Mean analytical values found: oxygen 210, carbon 720 parts per million. The tablets are then stepwise oxidized in a steel retort at 270 to 400° C. with 1.9 normal (S.T.P.) liters of oxygen and then heated for 1 hour under vacuum at 700° C.

In the second stage of the high temperature reaction under vacuum the material is successively heated to and kept at 1850° C. until a vacuum of $2.0 \times 10^{-4}$ mm. Hg has been reached. The tablets are then hydrated in known manner, comminuted, graded to a particle size below $125\mu$ and dehydrated. The powder obtained in this manner is distinguished by its high purity (contents, in parts per million: C, 70; N, 50; O, 1200; Fe, 13; Ni, Cr, Mn, Mg, Al, Si, Ca, Cu below 5, each) and its suitability for the manufacture of sintered capacitors. Anodes of 6.7 mm. diameter and a weight of 2 g., made from this powder by sintering it for 30 minutes at 2050° C., display an electric capacity of 5200 μfv. The breakdown voltage of the anodes, measured in 1% phosphoric acid solution, is above 300 v. Finished capacitors with a so-called dry electrolyte made therefrom may be used at 50 volts and 85° C., the leakage currents in all cases being below 50 μa. At room temperature all leakage currents at 50 v. are smaller than 4 μa.

Example 2

4.8 kilograms of the starting material described above are sintered in the first stage similar to the description in Example 1. In this case calculation reveals that 0.27% of additional oxygen is needed.

2 kilograms of the batch are impregnated with 70 ml. of a tantalum pentoxide suspension in ethanol, containing 0.42 g. of pentoxide per ml. By virtue of the great porosity of the tablets all liquids is absorbed by them; they are then dried and heated for 3 hours under vacuum at 700° C. They are then sintered as described in Example 1 and comminuted to powder form. The chemical analysis is comparable with that shown in Example 1; more especially, the oxygen content is below 1500 and the carbon content below 50 parts per million.

Anodes made from this powder have an electric capacity of 2700 μfv./gram.

Example 3

54 grams of tantalum ethylate, made up with ethanol to 100 ml., are poured over another 2 kg. of the pre-sintered tablets according to Example 2, and the whole is stirred. The solution is completely absorbed. After having been dried in air, the coated tablets are kept for one hour over steam at 110° C. and then heated under vacuum to 700° C.

The tablets are then subjected to the second reaction stage under a high vacuum as described in Example 1 and then comminuted to a powder having a maximum particle size of 125μ. Again, the contents of oxygen and carbon that can be achieved are below 1500 and 50 parts per million respectively.

Example 4

4.8 kilograms of the tableted starting mixture from graphite and oxide described in Example 1 are sintered in a high vacuum furnace as in the same example. There are obtained about 3.4 kg. of crude tantalum having a mean content of oxygen of 230 and of carbon of 810 parts per million.

400 grams of the tablets thus prepared are oxidized in a steel retort at 270 to 400° C. stepwise with 2.3 normal litres of oxygen, then thoroughly mixed with 1.6 kg. of unoxidized tablets and the whole is subjected to a second vacuum sintering operation as described in Example 1. The batch is heated at 1850° C., until a vacuum of 2×10⁻⁴ mm. Hg has been attained. The tablets obtained in this manner are then made up into a powder having a particle size not exceeding 125μ, which reveals the following values in the chemical analysis: contents in parts per million C, 23; O, 1400; N, 20; Fe, Ni, Cr all below 5.

Sinter anodes from this material of the same size as those in Example 1, have an electric capacity of 5300 μfv. From this powder, at a forming voltage of 150 v., reliable 50 v. capacitors with manganese dioxide as the so-called dry electrolyte, are manufactured; at a working voltage of 50 v. and at 85° C., their leakage currents are found to be substantially below 50 μv. in all cases.

What is claimed is:
1. A process for the preparation of tantalum powder, comprising the steps of:
   (a) placing a mixture of tantalum oxide and an amount of carbon stoichiometrically sufficient to reduce the tantalum oxide to tantalum powder under high vacuum and at a temperature below 2000° C. for a time sufficient to reduce said tantalum oxide to tantalum;
   (b) oxidizing the resulting tantalum to supply sufficient oxygen to overcome a deficiency of oxygen as caused in step (a); and
   (c) heating the tantalum powder as oxidized in step (b) and containing residual carbon from step (a) at a temperature below 2000° C. for a time sufficient to convert the powder to tantalum.
2. The process defined in claim 1 wherein the tantalum powder is heated in each of steps (a) and (c) to a temperature between 1600° and 1850° C.
3. The process defined in claim 1 wherein the tantalum is oxidized in step (b) with an oxygen containing gas.
4. The process defined in claim 1 wherein the tantalum is oxidized in step (b) by treating the product of step (a) with a suspension of a finely dispersed oxide or with a solution of a tantalum alcoholate.
5. The process defined in claim 2, further comprising the step (d) of incorporating a powder as formed in step (c) in a plate for a dry-electrolytic capacitor.

References Cited

UNITED STATES PATENTS

| | | | |
|---|---|---|---|
| 3,295,951 | 1/1967 | Fincham et al. | 75—0.5 |
| 3,323,914 | 6/1967 | Fincham et al. | 75—174 |
| 3,415,639 | 12/1968 | Daendliker et al. | 75—0.5 |
| 3,418,106 | 12/1968 | Pierret | 75—0.5 |

FOREIGN PATENTS 657,781   2/1963   Canada.

L. DEWAYNE RUTLEDGE, Primary Examiner

W. W. STALLARD, Assistant Examiner

U.S. Cl. X.R.

75—84